United States Patent [19]

Wasservogel

[11] 4,230,340
[45] Oct. 28, 1980

[54] TRAILER FOR COUPLING TO ROAD VEHICLES

[76] Inventor: François Wasservogel, Treffort, 01370 Saint-Etienne-du-Bois, France

[21] Appl. No.: 970,535

[22] Filed: Dec. 18, 1978

[51] Int. Cl.³ .............................................. B62B 5/00
[52] U.S. Cl. .................................. 280/656; 280/43.17
[58] Field of Search ...................... 280/43.17, 656, 63, 280/40, 292, 482, 491 R, 491 A, 491 E, 38, 39, 460 R; 224/42.42 R

[56] References Cited

U.S. PATENT DOCUMENTS

| | | | |
|---|---|---|---|
| 2,525,506 | 10/1950 | Wiedman | 280/763 X |
| 2,851,705 | 9/1958 | Smith et al. | 280/40 X |
| 3,201,143 | 8/1965 | Drong | 267/20 R X |

FOREIGN PATENT DOCUMENTS

| | | | |
|---|---|---|---|
| 1025188 | 1/1953 | France | 224/42.42 R |
| 7513895 | 6/1977 | Netherlands | 280/40 |
| 588912 | 6/1947 | United Kingdom | 280/33.44 |
| 1528582 | 10/1978 | United Kingdom | 280/40 |

*Primary Examiner*—John J. Love
*Assistant Examiner*—D. W. Underwood
*Attorney, Agent, or Firm*—Bacon & Thomas

[57] ABSTRACT

Accessory equipment for road vehicles.

The trailer comprises a chassis, whose side members 4 define, as from the rear cross-member 3, two clearances 5 for the clearance of wheels 12 of two running gears, mounted on cross-members 4 by adapting fitting 16 assuming a bearing support function and articulation—folding down function of said running gears.

A trailer is provided which can be folded up within the boot of a car.

4 Claims, 6 Drawing Figures

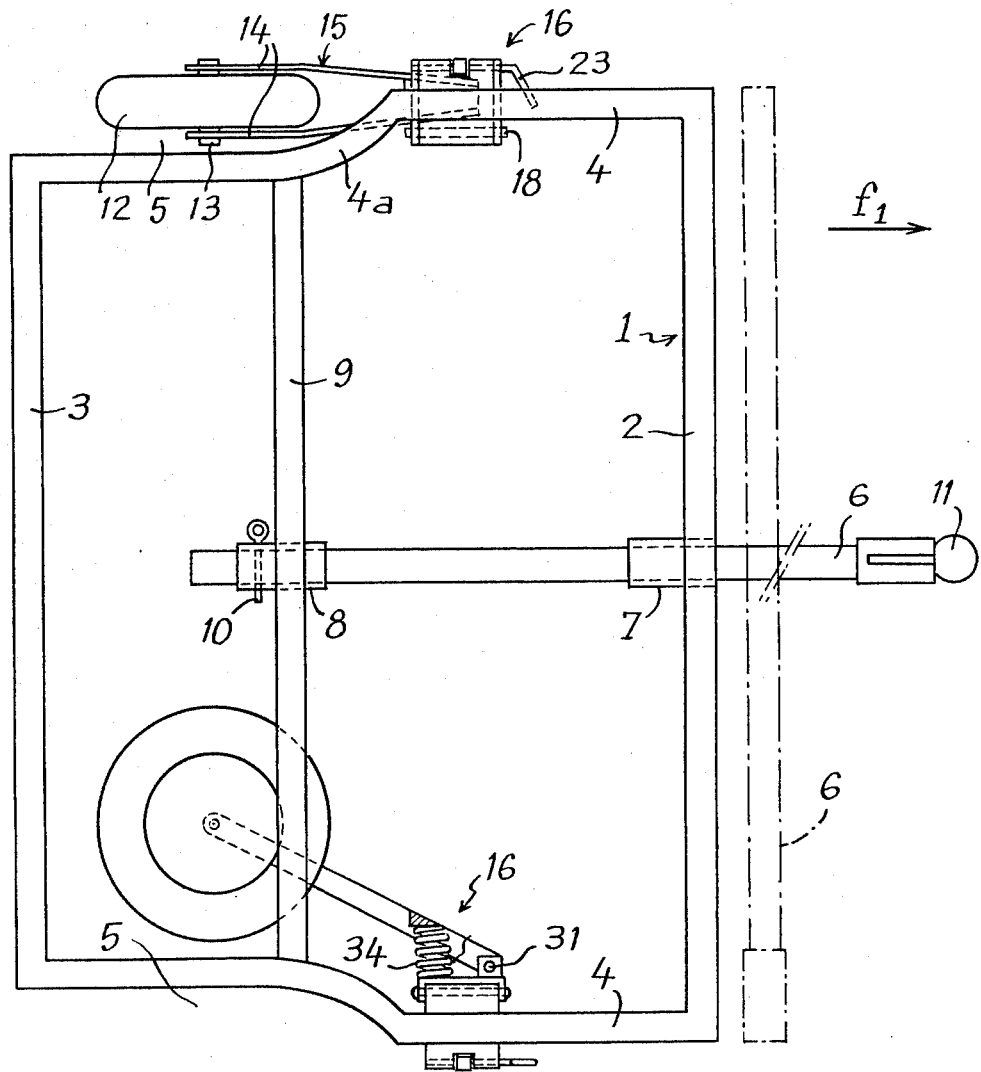
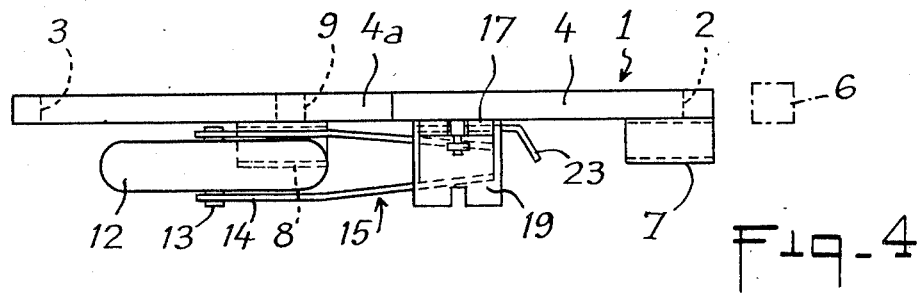

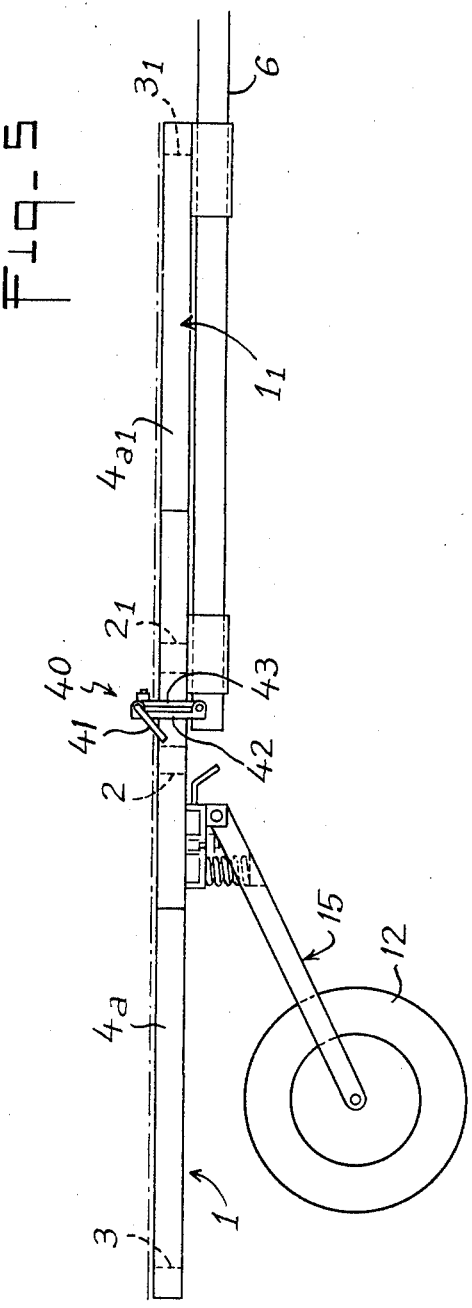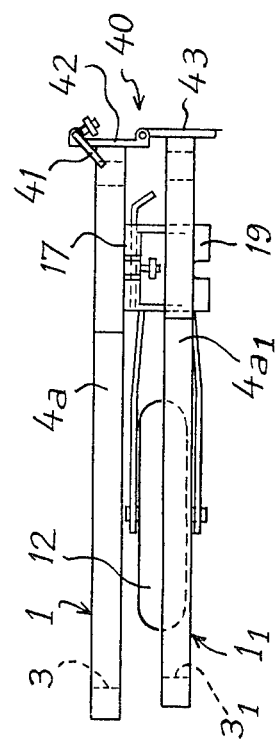

TRAILER FOR COUPLING TO ROAD VEHICLES

BACKGROUND OF THE INVENTION

The present invention relates to trailers to be coupled to motor vehicles and more particularly to cars.

To increase the loading capacity, either as regards weight or as regards volume of cars, it has long been known to couple thereto a trailer constituting an external loading volume.

The presently commercially available trailers used for this purpose are of two types. The first type is based on a fixed structure which defines an intangible loading volume or which may optionally be varied by adding sides or racks which can be adapted by superimposing. Such a trailer is satisfactory for the main function of transporting loads, but causes a problem of storage when it is not in use in view of the fact that it is necessary to have a closed area offering a ground surface which is at least equal to the overall dimensions of the trailer in order to permit safe storage of the same.

The second type is a variant of the first in that it uses a structure comprising components which are normally assembled for use and which can be dismantled so as to reduce the overall dimensions of the trailer. Thus, when not in use, such a trailer can be stored within a car port or garage of conventional design used for the towing vehicle.

However, the presently available two types of trailer do not give satisfaction to users not having a completely closed personal parking or garaging location, because they cannot consider the acquisition of a trailer necessary for the occasional transportation of heavy or voluminous loads which cannot or cannot easily be placed within the vehicle or in its boot.

BRIEF SUMMARY OF THE INVENTION

The object of the invention is to obviate this disadvantage by proposing a novel trailer for cars and in particular designed in such a way that it can be stored within the boot of a vehicle when it is not in use, so that the user always has the possibility of utilizing, when need be, the supplementary loading capacity offered in this way, without having to have a special location for storing such a trailer.

The object of the invention is also designed in such a way that the necessary adaptation operations for bringing the trailer into a state of effective use or conversely into a state of availability within the vehicle boot can be performed in a rapid practical manner without requiring special tools and without possibility of error.

The object of the invention is also designed in such a way that it is possible to house the trailer within the boot of any vehicle, even a small car, which may or may not have a transformable passenger area (hatch-back).

In accordance with the invention, the trailer for a motor vehicle having a chassis associated with a tow bar and two suspension and running gears is characterised in that the chassis is in the form of a tubular structure having two cross-members and two side-members defining, at least as from the rear cross-member in the towing direction, two clearances for the wheel clearances of the two assemblies which are mounted on the two side-members by means of two adapting fittings having a supporting, bearing and articulation-folding back function for the said assemblies within the polygon defined by the chassis and parallel to the latter.

BRIEF DESCRIPTION OF THE DRAWINGS

The following description describes non-limitative embodiments of the invention, with reference to the attached drawings, wherein show:

FIG. 2 a plan view along the line II—II of FIG. 1.

FIG. 4 a side elevation identical to FIG. 1, but showing one of the possibilities of the object of the invention.

FIG. 5 a side elevation identical to FIG. 1, but showing a variant of the object of the invention.

FIG. 6 a side view showing one of the advantages of the constructive arrangement of FIG. 5.

DETAILED DESCRIPTION OF THE PREFERRED EMBODIMENTS

Figure 1:
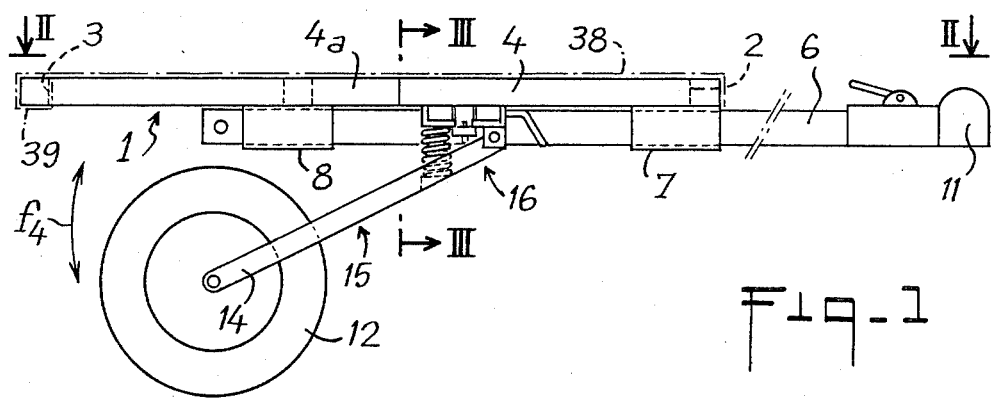
FIG. 1 a side elevation and partly in section of the object of the invention.
Figure 3:
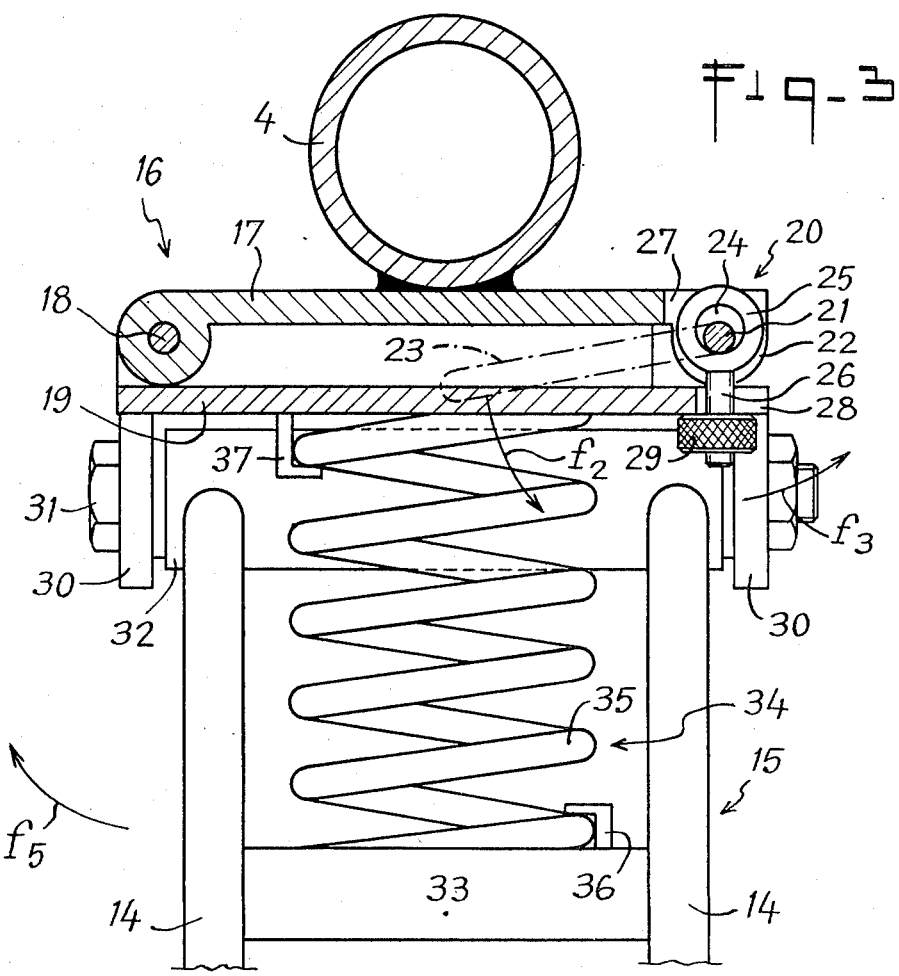
FIG. 3 a larger scale partial cross-section along the line III—III of FIG. 1.

According to the embodiment of FIGS. 1 to 3, the trailer according to the invention comprises a chassis 1 constituted by two cross-members 2 and 3 interconnected by two side-members 4. The components of chassis 1 are preferably in the form of metal sections, for example a tubular-typed closed section and in particular a light-weight alloy. As from their substantially median point the side-members 4 have portions 4a which are bent towards the inside of the frame defined by chassis 1 and in the direction of cross-member 3 in such a way as to define clearances 5.

Chassis 1 is associated with a tow bar 6, whose length is equal to the width of chassis 1 taking them essentially level with cross-member 2. The adaptation and fitting of tow bar 6 onto chassis 1 are realised by a bush 7 suspended on cross-member 2 and which is able to ensure the sliding and guidance of two bar 6 up to a support and assembly sleeve 8, which is rendered integral with cross-member 3 or, optionally, an intermediate cross-member 9. The connection between tow bar 6 and assembly sleeve 8 is provided by a removable pin 10 of the elastic locking type or optionally any other type. Although this is not shown, at the opposite end to a coupling head 11 tow bar 6 has different holes reserved for the passage of pin 10 and permitting the regulation of the projection of tow bar 6 relative to cross-member 2 and consequently the gap between chassis 1 and the rear part of a not shown towing vehicle.

Chassis 1 is provided with two suspension and running gears each having a wheel 12 carried by an axle 13 between the arms 14 of a fork 15, mounted on a corresponding side-member 4 by an adapting fitting 16. As can be gathered from FIG. 3, each adapting fitting 16 has a fixed plate 7 which, by means e.g. of welding, is rendered integral with side-member 4 in the part of the latter preceding the bent portion 4a, when considered in the normal towing direction defined by arrow $f_1$ in FIG. 2. On its edge located towards the inside of chassis 1 fixed plate 17 supports a hinge pin 18 extending parallel to the tension axis of the chassis, defined by tow bar 6. Hinge pin 18 supports an articulated plate 19 maintained on the fixed plate via a high-speed locking member 20. According to a preferred arrangement, the high-speed locking member 20 comprises a spindle 21 mounted in bearings 22 on the fixed plate. Spindle 21 is extended to the outside of the fixed plate by an operating handle 23 which permits the control of the rotation of spindle 21 within bearings 22. In its median portion, spindle 21 has an eccentric cylindrical bearing surface 24 which traverses the cylindrical hole of head 25 of threaded rod 26 engaged in an opening 27 on fixed plate 17. Threaded rod 26 is normally engaged in a slot 28 in articulated plate 19, externally of which the threaded rod 26 is provided with a nut 29.

The operation of locking member 20 consists firstly of regulating the screwing of nut 29 on threaded rod 26 so as to reduce as far as possible the clearance between the facing parallel plates 17 and 19, then turning in the appropriate direction handle 23 in such a way that the eccentric bearing surface 24 is brought into operation in order to introduce by the eccentric operation of said bearing surface 24 a tension action on rod 26 ensuring, via nut 29, the locking of plate 19 on plate 17. FIG. 3 shows the locking member 20 in its maximum locking position, from which plate 19 is freed from plate 17 by operating handle 23 in the direction of arrow $f_2$ in order to permit the disengagement of nut 29 by rotating head 25 in the direction of arrow $f_3$ about bearing surface 24.

Adapting fitting 16 also comprises two suspended bearings 30 carried by plate 19 and serving to support a spindle 31 traversing a tube 32 connecting the arms 14 of fork 15. Arms 14, as shown in FIG. 3, are interconnected by a spacer 43 which also constitutes a bearing member for a shock absorber 34 which is, for example, constituted by a helical spring 35 functioning under compression and placed under stress between spacer 33 and plate 19. Locking members 36 and 37 are preferably provided on spacer 33 and plate 19 to prevent any untimely disengagement of helical spring 35.

The preceding description and the following drawings show that the adaptation fittings support the spindles 31 of wheels 12 which, as shown in FIG. 2, are normally positioned to the right of clearances 5 permitting them to be freely displaced in one or other of the directions of arrow $f_4$, as a function of the load and the running stresses, due to the presence of shock absorbers 34 located between each fork and the plate 19 corresponding to the wheel in question. This arrangement makes it possible to provide a suspensions and running gear for each of the sides of chassis 1 and to permit the mounting and adaptation of such an independent assembly, substantially in the occupation polygon on the bottom of the chassis.

Each adaptation fitting 16 also has a supplementary function namely that of providing the bearing support for the coresponding spring 34 placed between spacer 33 and plate 19. Each fitting, 16 also fulfils a third fuction which is that of the articulation and the possible flapping back of the wheel 12 to within the polygon of chassis 1. As stated hereinbefore, it is merely necessary to operate handle 23 in the direction of arrow $f_2$ to cancel out the tensile stress applied to threaded rod 26 in order to ensure the immobilisation of plate 19 on plate 17. Threaded rod 26 can thus be disengaged from slot 28 in such a way that plate 19 can then be pivoted on spindle 18 in the direction of arrow $f_5$ (FIG. 3) in such a way as to bring the corresponding suspension and running gears into the position shown in the lower part of FIG. 2. In this position, each assembly is completely located within the chassis 1, so that after disassembling the tow bar 6 by means of the removable pin 10 the chassis can easily be housed in a vehicle boot. Thus, it is merely necessary to ensure the engagement of chassis 1 for firstly directing cross-member 3 towards the inside of the boot in such a way that the clearances 5 of the chassis, totally freed by the retraction of the suspension and running gears then disposed in a lower parallel plane, as illustrated in FIG. 4, can if necessary engage in the passages of the wheels generally defined within the boot of a vehicle. Thus, the primary function of clearances 5 is to provide a clearance for wheels 12 which can be substantially aligned with the side members 4, whilst they also house the wheel passages of the vehicle boot. Thus, the chassis can be placed flat within the boot and only takes up a limited volume of limited height, leaving the remaining capacity for receiving or storing packets, luggage or other loads. The complete housing of the folded trailer within the boot is completed by arranging tow bar 8 disposed in the position of FIGS. 2 and 4 parallel to cross-member 2.

In view of the construction of the trailer according to the invention, it thus becomes possible to permanently place the trailer in its folded state within a carboot and to easily extract such a trailer to bring it into an effective state of use, because it is merely necessary to remove it from the boot, replace each suspension and running gear in its effective position via the high-speed locking member 20 and to house the tow bar 6 in order to permit the coupling to a vehicle and the loading of the thus provided platform. As shown in FIG. 1 by dot-dash lines, it is advantageous to associate with chassis 1 a plate 38 with the same surface area mounted on said chassis by any appropriate high-speed attachment and particularly by clips. Plate 38 has the advantage of permitting an easy loading and of additionally constituting, when placed above the trailer in its folded state within the vehicle boot, the floor of said boot permitting the use of the available volume of the boot for supporting any load or package.

FIGS. 5 and 6 show a variant for increasing the loading capacity of the trailer, without eliminating the advantages described hereinbefore. In this variant, chassis 1 is completed by a chassis 1a symmetrical thereto, i.e. the side members $4_1$ also have been portions $4a_1$ for defining two clearances $5_1$. In this variant, chasses 1 and $1_1$ are associated by their cross-members 2 and $2_1$, which face one another, in such a way that clearances 5 and $5_1$ are opposite. The connection between chasses 1 and $1_1$ is provided by means of two adapting members 40 which are preferably of the same type as fitting 16 and in such a way as to permit a high-speed attachment via locking members 41 between two plates 42 and 43, which are respectively fixed to the ends of the side members of chasses 1 and $1_1$. FIG. 5 shows the trailer in its state of use in which chasses 1 and $1_1$, which to a certain extent represent half-chasses positioned as extensions and in alignment with one another to form the true chassis of the trailer, are aligned by means of members 40 which can be manipulated, as described hereinbefore with reference to the operation of fitting 16 in FIG. 3, to permit the folding back of chassis $1_1$ in the direction of arrow $f_6$ following the retraction of the suspension and running gears in order to place the chassis $1_1$ parallel to chassis 1, thus ensuring the maintenance of the two foldable assemblies between these two chasses. In this embodiment, the loading capacity can be doubled without there being any significant increase in the overall dimensions of the trailer in its folded state.

FIG. 5 shows that in this case the tow bar 16 is mounted beneath chassis $1_1$.

The invention is not limited to the embodiments described and represented hereinbefore and various modifications can be made thereto without passing beyond the scope of the invention.

What is claimed is:

1. A trailer for motor vehicles, comprising:
a substantially flat bed having a first portion of predetermined width and a narrower rear portion having side edges spaced inwardly of the side edges of said first portion to define clearance spaces at the rear edges of said bed;
a tow bar removably secured to said bed;
a pair of ground wheels and mounting means pivotally mounting said ground wheels to said bed for pivotal movement about fore-and-aft axes below and adjacent the side edges of said first portion, each of said mounting means extending rearwardly from its axis whereby said wheels and mounting means may be selectively pivoted about said axes to position said wheels in running position below said clearance spaces or folded position within the outline of said rear portion of said bed.

2. A trailer as defined in claim 1 wherein each said mounting means includes a fork embracing and rotatably supporting its wheel said forks being pivoted to fittings journalled about said axes; and shock absorbers acting between said forks and fittings.

3. A trailer as defined in claim 1 including a second bed member hinged to the forward edge of said first portion and swingable to be over said flat bed or to extend forwardly therefrom, said second bed member being of the same size and shape as said flat bed, its outline being substantially congruent to that of said flat bed when swung to be thereover.

4. A trailer as defined in claim 1 wherein said tow bar is of a length no greater than the greatest width of said flat bed.

* * * * *